Jan. 24, 1939.  B. NAY  2,145,190
SWIVEL JOINT HARD OIL REMOVER
Filed May 24, 1938
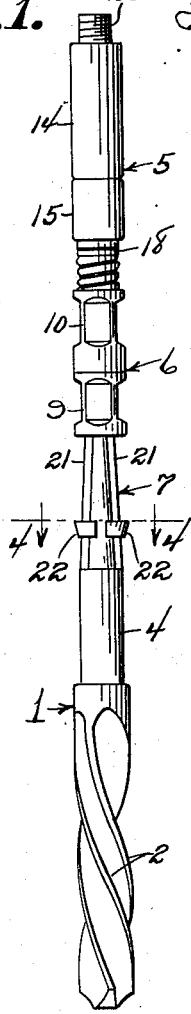
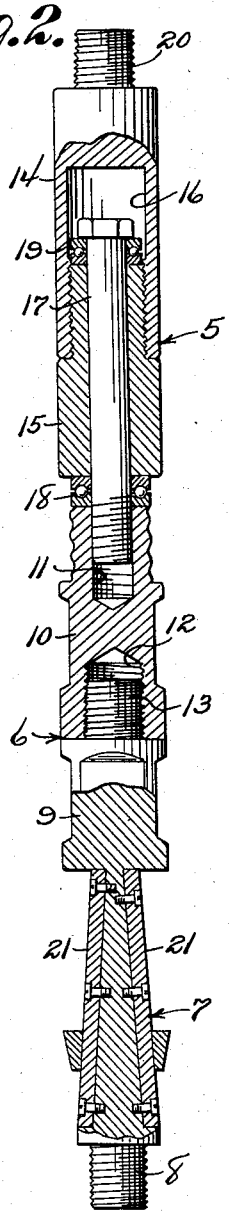
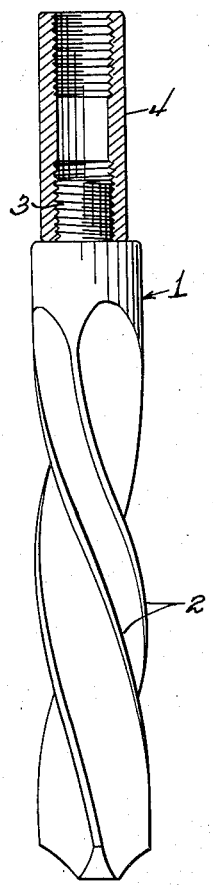
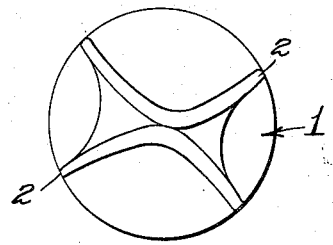
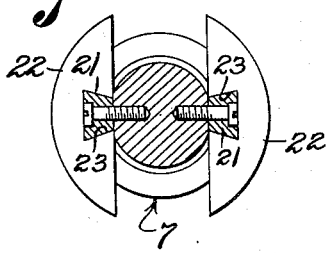
B. Nay
INVENTOR
BY Victor J. Evans & Co.
ATTORNEYS Patented Jan. 24, 1939

2,145,190

UNITED STATES PATENT OFFICE 2,145,190

SWIVEL JOINT HARD OIL REMOVER

Bert Nay, Greggton, Tex.

Application May 24, 1938, Serial No. 209,785

3 Claims. (Cl. 166—18)

This invention relates to tools for removing paraffine and other foreign matter from walls of tubing of oil wells and has for the primary object the provision of a device of this character which when lowered into a well tubing at the end of the line will scrape the foreign matter loose by a sliding and rotating movement and feed the loosened material upwardly to be lifted from the tubing during the withdrawal of the device from the well, said device having means for carrying the loosened material on its movement from the well.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating a tool constructed in accordance with my invention.

Figure 2 is a vertical sectional view showing the mounting for the cutter and which includes a rotatable coupler for connection with an operating line.

Figure 3 is a side elevation, partly in section, showing the cutting tool.

Figure 4 is a sectional view taken on the line 4—4 of Figure 1.

Figure 5 is an end view illustrating the cutter.

Referring in detail to the drawing, the numeral 1 indicates a rotatable cutter constructed somewhat along the lines of a bit wherein the cutting edges 2 are of spiral formation and each cutting edge extending approximately one-half of the circumference of the cutter. The cutter has a reduced screw threaded shank 3 for threading into a coupling sleeve 4.

A mounting for the cutter consists of a rotatable coupler 5, a detachable joint 6 and an attaching member 7. Said member 7 has a screw threaded extension 8 for threading into the sleeve 4. The member 7 forms an integral part of a section 9 of the joint 6. The joint 6 also includes a section 10 having screw threaded sockets 11 and 12. A screw threaded extension 13 is formed on the section 9 and threads into the socket 12.

The coupler 5 consists of detachable sections 14 and 15 threaded together and the section 15 has a bore therethrough communicating at one end with a chamber 16 formed in the section 14. A bolt 17 extends through the bore with the head thereof within the chamber 16. The bolt 17 threads into the chamber 11 of the section 10.

A thrust bearing 18 is mounted on the bolt and is located between the section 10 of the joint 6 and the section 15 of the coupler 5. An antifriction bearing 19 is mounted on the bolt 17 between the head thereof and the end of the section 15 of the coupler. The joint 6 being connected to the coupler 5 by the bolt 17 as described will permit the coupler and the mounting 7 to rotate relative to the coupler 5, the latter having at one end a screw threaded extension 20 to permit the coupler to be easily connected with a fitting (not shown) on the end of a lowering line.

Converging guides 21 are secured on the mounting 7 and converge towards the line attaching end of the device and are of tenon-shape in cross section. Segmental shaped blocks 22 have grooves 23 to slidably receive the guides 21. The blocks are mounted on opposite sides of the mounting 7 and are free to slide upwardly and downwardly so that said blocks may readily adjust themselves to the walls of a well tubing during the lowering of the tool in the tubing.

In operation, the tool is lowered into the well and the cutter sliding with frictional contact with the foreign material adhering to the well tubing will be made to rotate due to the formation of the cutting edges. The rotating motion along with the sliding motion of the cutter will scrape from the walls of the well tubing foreign material feeding said material upwardly past the blocks 22 so that as the device in entirety is drawn from the well and the blocks contacting the walls of the well tubing with a certain amount of friction will carry the loosened material upwardly from the well along with the device.

What is claimed is:

1. A tool of the character set forth comprising a mounting, a cutter detachably secured to said mounting and including a plurality of cutting ribs arranged in spiral formation each extending approximately one-half of the circumference of said cutter, upwardly converging guides formed on said mounting, blocks slidable on said guides to frictionally contact walls of a well tubing, and means for connecting said mounting to an operating medium.

2. A tool of the character set forth comprising a mounting, a cutter detachably secured to said mounting and including a plurality of cutting ribs arranged in spiral formation each extending approximately one-half of the circumference of said cutter, upwardly converging guides formed on said mounting, blocks slidable on said guides to frictionally contact walls of a well tubing, a joint including detachable sections and one of said sections integral with said mounting, and a coupler rotatably connected to the other section of the joint.

3. A tool of the character set forth comprising a mounting, a cutter detachably secured to said mounting and including a plurality of cutting ribs arranged in spiral formation each extending approximately one-half of the circumference of said cutter, upwardly converging guides formed on said mounting, blocks slidable on said guides to frictionally contact walls of a well tubing, a joint including detachable sections and one of said sections integral with said mounting, a coupler rotatably connected to the other section of the joint, a thrust bearing between the last-named section of the joint and the coupler.

BERT NAY.